US010013750B2

(12) United States Patent
Zhang et al.

(10) Patent No.: US 10,013,750 B2
(45) Date of Patent: *Jul. 3, 2018

(54) OBJECT DETECTION METHODS, DISPLAY METHODS AND APPARATUSES

(71) Applicants: Tsinghua University, Haidian District, Beijing (CN); Nuctech Company Limited, Haidian District, Beijing (CN)

(72) Inventors: Li Zhang, Beijing (CN); Zhiqiang Chen, Beijing (CN); Ziran Zhao, Beijing (CN); Qiang Li, Beijing (CN); Jianping Gu, Beijing (CN); Yunda Sun, Beijing (CN)

(73) Assignees: Tsinghua University, Haidian District, Beijing (CN); Nuctech Company Limited, Haidian District, Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 14/138,399

(22) Filed: Dec. 23, 2013

(65) Prior Publication Data
US 2015/0332448 A1 Nov. 19, 2015

(30) Foreign Application Priority Data

Dec. 27, 2012 (CN) .......................... 2012 1 0581468

(51) Int. Cl.
*G06T 7/00* (2017.01)
*G06T 9/00* (2006.01)
(Continued)

(52) U.S. Cl.
CPC ............ *G06T 7/0004* (2013.01); *G01V 5/005* (2013.01); *G06K 9/00201* (2013.01);
(Continued)

(58) Field of Classification Search
CPC ..... G06T 7/0002; G06T 7/0004; G06T 15/08; G06T 2200/04; G06T 2207/10116; G06T 2207/30112; G06K 9/00201; G01V 5/005
See application file for complete search history.

(56) References Cited

U.S. PATENT DOCUMENTS 5,659,624 A * 8/1997 Fazzari et al. ................ 382/110
5,796,802 A * 8/1998 Gordon .................. G01V 5/005
378/8

(Continued)

OTHER PUBLICATIONS

Ushizima et al. "Statistical segmentation and porosity quantification of 3D X-ray micro-tomography." SPIE Optics and Photonics: XXXIV Applications of Digital Image Processing (2011): 8135-1.*

*Primary Examiner* — Katrina Fujita
(74) *Attorney, Agent, or Firm* — Merchant & Gould P.C.

(57) ABSTRACT

Disclosed are object detection method, display methods and apparatuses. The method includes obtaining slice data of inspected luggage in the CT system; generating 3D volume data of objects in the luggage from the slice data; for each object, determining a semantic description including at least a quantifier description of the object based on the 3D volume data; and upon reception of a user selection of an object, presenting the semantic description of the selected object while displaying a 3D image of the object. The above solutions can create a 3D model for objects in the inspected luggage in a relatively accurate manner, and thus provide better basis for subsequent shape feature extraction and security inspection, and reduce omission factor.

14 Claims, 4 Drawing Sheets

(51) Int. Cl.
  *G06T 15/08*   (2011.01)
  *G01V 5/00*   (2006.01)
  *G06K 9/00*   (2006.01)

(52) U.S. Cl.
  CPC ............ *G06T 7/0002* (2013.01); *G06T 15/08* (2013.01); *G06T 2200/04* (2013.01); *G06T 2207/10116* (2013.01); *G06T 2207/30112* (2013.01)

(56) References Cited

U.S. PATENT DOCUMENTS

| | | | | |
|---|---|---|---|---|
| 6,026,143 | A * | 2/2000 | Simanovsky et al. | 378/57 |
| 6,026,171 | A * | 2/2000 | Hiraoglu et al. | 382/100 |
| 6,035,014 | A * | 3/2000 | Hiraoglu et al. | 378/57 |
| 6,067,366 | A * | 5/2000 | Simanovsky et al. | 382/100 |
| 6,075,871 | A * | 6/2000 | Simanovsky et al. | 382/100 |
| 6,076,400 | A * | 6/2000 | Bechwati et al. | 73/433 |
| 6,078,642 | A * | 6/2000 | Simanovsky et al. | 378/57 |
| 6,088,423 | A * | 7/2000 | Krug | G01V 5/0016 378/4 |
| 6,092,059 | A * | 7/2000 | Straforini et al. | 706/14 |
| 6,108,396 | A * | 8/2000 | Bechwati et al. | 378/4 |
| 6,111,974 | A * | 8/2000 | Hiraoglu et al. | 382/100 |
| 6,128,365 | A * | 10/2000 | Bechwati et al. | 378/57 |
| 6,195,444 | B1 * | 2/2001 | Simanovsky et al. | 382/100 |
| 6,272,230 | B1 * | 8/2001 | Hiraoglu et al. | 382/100 |
| 6,317,509 | B1 * | 11/2001 | Simanovsky et al. | 382/131 |
| 6,345,113 | B1 * | 2/2002 | Crawford et al. | 382/131 |
| 6,813,374 | B1 * | 11/2004 | Karimi et al. | 382/131 |
| 6,816,571 | B2 * | 11/2004 | Bijjani | G01N 23/046 378/57 |
| 7,277,577 | B2 * | 10/2007 | Ying et al. | 382/168 |
| 7,327,853 | B2 * | 2/2008 | Ying et al. | 382/100 |
| 7,356,174 | B2 * | 4/2008 | Leue et al. | 382/131 |
| 7,606,348 | B2 * | 10/2009 | Foland | G01N 23/046 378/4 |
| 7,813,540 | B1 * | 10/2010 | Kraft | 382/143 |
| 7,899,232 | B2 * | 3/2011 | Gudmundson et al. | 382/132 |
| 7,907,762 | B2 * | 3/2011 | Ramsay et al. | 382/128 |
| 7,991,242 | B2 * | 8/2011 | Perron et al. | 382/275 |
| 8,090,150 | B2 * | 1/2012 | Garms | 382/103 |
| 8,254,656 | B2 * | 8/2012 | Ingerman et al. | 382/131 |
| 8,633,823 | B2 * | 1/2014 | Armistead et al. | 340/600 |
| 8,885,938 | B2 * | 11/2014 | Hong et al. | 382/173 |
| 9,042,661 | B2 * | 5/2015 | Pavlovich et al. | 382/218 |
| 9,134,258 | B2 * | 9/2015 | Basu et al. | |
| 2001/0014137 | A1 * | 8/2001 | Bjorkholm | G01N 23/04 378/57 |
| 2003/0095631 | A1 * | 5/2003 | Rosner | G01N 23/02 378/98.12 |
| 2005/0058242 | A1 * | 3/2005 | Peschmann | G01V 5/0016 378/57 |
| 2007/0058037 | A1 * | 3/2007 | Bergeron et al. | 348/82 |
| 2008/0063140 | A1 * | 3/2008 | Awad | G01N 23/04 378/57 |
| 2008/0253653 | A1 * | 10/2008 | Gable | 382/173 |
| 2009/0174554 | A1 * | 7/2009 | Bergeron et al. | 340/568.1 |
| 2010/0046704 | A1 * | 2/2010 | Song et al. | 378/57 |
| 2010/0295689 | A1 * | 11/2010 | Armistead, Jr. | G06K 9/00 340/600 |
| 2012/0177273 | A1 * | 7/2012 | Naidu | G06T 11/005 382/131 |
| 2013/0051647 | A1 * | 2/2013 | Miao | G06T 7/0032 382/132 |
| 2014/0332685 | A1 * | 11/2014 | Anghel | G01N 23/046 250/307 |

\* cited by examiner

OBJECT DETECTION METHODS, DISPLAY METHODS AND APPARATUSES

This application claims benefit of Serial No. 201210581468.5, filed 27 Dec. 2013 in China and which application is incorporated herein by reference. To the extent appropriate, a claim of priority is made to each of the above disclosed applications.

TECHNICAL FIELD

The present disclosure relates to inspection of objects, and in particular to object detection method, display methods and apparatuses.

BACKGROUND

Radiography is an essential tool in security inspection, and typically implemented in the following process. First, a radiography device scans luggage and generates an image of the luggage. An inspector checks the image, manually marks regions of suspicious objects, and adds semantic description of these regions, such as "lighter," and "a bottle of wine." This process relies largely on human factor, and may leave some dangerous article undetected when the dangerous article occurs in a very low frequency, or when the inspector has inadequate experience or is influenced by factors including fatigue. This will lead to serious aftermath.

A typical measurement to solve the above problem is to primarily rely on automatic detection while interaction between the inspector and the device is auxiliary. The automatic detection technology is not satisfactory nowadays. Some typical techniques, such as explosive detection, and high-density alarm, cannot satisfactorily meet the application requirements. This is because that there are certain technical limits, such as object aliasing caused by perspective overlapping in DEDR (Dual Energy Digital Radiography), and on the other hand, research in this aspect is few, while updated technology like DECT (Dual Energy Computed Tomography) needs support from new detection algorithms.

DECT is a preferable solution to the above problem. DECT is developed from DR and CT technologies, and can obtain effective atomic number and equivalent electron density inside a scanned object while acquiring 3D structure information of the object. Accordingly, DECT provides possibility of better understanding of the scanned content thorough 3D data. However, the current research is focused on detection of specific objects, and mainly relies on pixel-level information of density and atomic number. Thus, there is a lack of recognition of "object" information.

SUMMARY

The present disclosure provides object detection method, display methods and apparatuses, in order to achieve more accurate security inspection of objects.

In an aspect of the present disclosure, a method for inspecting luggage in a CT system is provided comprising: obtaining slice data of the inspected luggage in the CT system; generating 3D volume data of at least one object in the luggage from the slice data; calculating first, second and third depth projection images of the object in three directions based on the 3D volume data, wherein projection direction of the third depth projection image is orthogonal to those of the first and second depth projection images; calculating a metric of symmetry, and a duty ratio and aspect ratio for each of the first, second, and third depth projection images, and a metric of similarity between each two of the first, second, and third depth projection images; generating a shape feature parameter of the object at least based on the metrics of symmetry, the metrics of similarity, the duty ratios and aspect ratios of the first to third depth projection images; classify the shape feature parameter with a classifier based on shape feature to obtain a quantifier description expressing the shape of the object; and outputting a semantic description including at least the quantifier description of the object.

In another aspect of the present disclosure, an apparatus for inspecting luggage in a CT system is provided comprising: means for obtaining slice data of the inspected luggage in the CT system; means for generating 3D volume data of at least one object in the luggage from the slice data; means for calculating first, second and third depth projection images of the object in three directions based on the 3D volume data, wherein projection direction of the third depth projection image is orthogonal to those of the first and second depth projection images; means for calculating a metric of symmetry, and a duty ratio and aspect ratio for each of the first, second, and third depth projection images, and a metric of similarity between each two of the first, second, and third depth projection images; means for generating a shape feature parameter of the object at least based on the metrics of symmetry, the metrics of similarity, the duty ratios and aspect ratios of the first to third depth projection images; means for classify the shape feature parameter with a classifier based on shape feature to obtain a quantifier description expressing the shape of the object; and means for outputting a semantic description including at least the quantifier description of the object.

In a further aspect of the present disclosure, a method for displaying objects in a CT system is provided comprising: obtaining slice data of inspected luggage in the CT system; generating 3D volume data of objects in the luggage from the slice data; for each object, determining a semantic description including at least a quantifier description of the object based on the 3D volume data; and upon reception of a user selection of an object, presenting the semantic description of the selected object while displaying a 3D image of the object.

In a still further aspect of the present disclosure, an apparatus for displaying objects in a CT system is provided comprising: means for obtaining slice data of inspected luggage in the CT system; means for generating 3D volume data of objects in the luggage from the slice data; means for determining a semantic description including at least a quantifier description of each of the objects based on the 3D volume data; and means for, upon reception of a user selection of an object, presenting the semantic description of the selected object while displaying a 3D image of the object.

With the above solutions, automatic auxiliary detection of objects in luggage can be achieved by automatic detection and description. The resultant descriptions of the objects are necessary supplement to manual detection, and also functions to enhance man-machine interaction. It is applicable and useful to mitigate the omission factor.

BRIEF DESCRIPTION OF THE DRAWINGS

The following figures illustrate implementations of the present disclosure. The figures and implementations provide some embodiments of the present disclosure in a non-limiting and non-exclusive manner, in which.

DETAILED DESCRIPTION OF THE EMBODIMENTS

Figure 1:
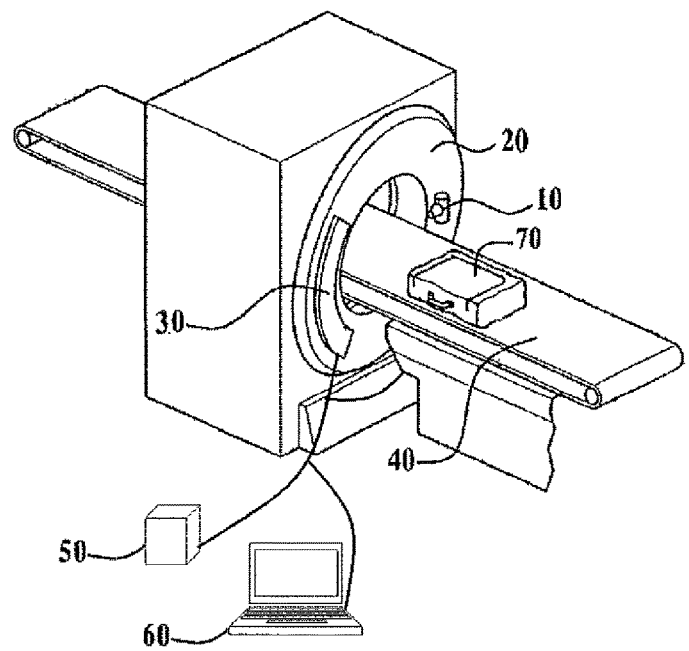
FIG. 1 is a schematic diagram showing the structure of a CT system according to an embodiment of the present disclosure.

In the following, particular embodiments of the present disclosure will be detailed. To be noted, the described embodiments are just intended for illustrating other than limiting the present disclosure. Numerous specific details are illustrated for a clear and thorough understanding of the present disclosure. It is apparent to those skilled in the art that these specific details are not necessary for implementation of the present disclosure. Detailed description of known structures, materials or methods are omitted which otherwise may obscure the present disclosure.

Throughout the specification, reference to "an embodiment," "embodiments," "an example" or "examples" means that particular features, structures or characteristics described in connection with such embodiment or example are contained in at least one embodiment of the present disclosure. The phrase "an embodiment," "embodiments," "an example" or "examples" in various places throughout the specification does not necessarily refer to the same embodiment or example. Further, the particular features, structures or characteristics may be contained in one or more embodiments or examples in any appropriate combination and/or sub-combination. Those skilled in the art will appreciate that the term "and/or" herein indicates any or all combinations of one or more of the listed items.

In view of disadvantages in the conventional security inspection technologies which utilize only physical property information of objects in luggage, embodiments of the present disclosure provide a method for luggage inspection in a CT system. After obtaining the slice data of the inspected luggage in the CT system, the 3D volume data of at least one object in the luggage are generated from the slice data. Then, first, second and third depth projection images of the object in three directions are calculated based on the 3D volume data. The projection direction of the third depth projection image is orthogonal to those of the first and second depth projection images. Next, a metric of symmetry, and a duty ratio and aspect ratio is calculated for each of the first, second, and third depth projection images, and a metric of similarity is calculated for each two of the first, second, and third depth projection images. A shape feature parameter of the object is generated at least based on the metrics of symmetry, the metrics of similarity, the duty ratios and aspect ratios of the first to third depth projection images. The shape feature parameter is classified with a classifier based on shape feature to obtain a quantifier description expressing the shape of the object. Then, a semantic description including at least the quantifier description of the object is outputted. In this way, the shape feature of the object is obtained by processing object data acquired in the CT system, and outputted in a form of semantic description. This presents to the inspector an intuitive, accurate, specific description of the object in the inspected luggage, and thus reduces the omission factor.

According to another embodiment, a method for displaying objects in a CT system is provided to reduce the omission factor. After obtaining the slice data of the inspected luggage in the CT system, the 3D volume data of the respective objects in the luggage are generated from the slice data. Then, for each object, a semantic description including at least a quantifier description of the object is determined based on the 3D volume data. Upon reception of a user selection of an object, the semantic description of the selected object is presented while displaying the 3D image of the object. In this way, when luggage are inspected in the CT apparatus, semantic description of an object selected by the inspector is outputted on screen, in addition to images of objects in the inspected luggage. This reduces omission factor.

According to another embodiment of the present disclosure, a method for creating a 3D model for objects in an inspected luggage in a CT system is provided in order to achieve more accurate shape feature extraction of the objects. After obtaining the slice data of the inspected luggage in the CT system, the slice data are interpolated to generate 3D volume data of the luggage. Then, Unsupervised segmentation is performed on the 3D volume data of the luggage to obtain a plurality of segmental regions, which will undergo isosurface extraction to obtain corresponding isosurfaces. Next, 3D surface segmentation is performed on the isosurfaces to form a 3D model for the objects in the luggage. Such 3D model for objects in the luggage can describes the 3D surfaces of the objects in a more accurate manner, provide a better basis for subsequent 3D shape feature extraction, and thus improve accuracy in security inspection.

FIG. 1 is a schematic diagram showing the structure of a CT apparatus according to an embodiment of the present disclosure. As shown in FIG. 1, the CT apparatus of the embodiment includes a rack 20, a bearing mechanism 40, a controller 50, and a computer data processor 60. The rack 20 includes a ray source 10 configured to emit x rays for inspection, such as x-ray machine, and a detection & collection device 30. The bearing mechanism 40 bears an inspected luggage 70, and moves with it to pass through a scanning region between the ray source 10 and the detection & collection device 30 in the rack 20. At the same time, the rack 20 rotates about an axis along the travel direction of luggage 70, so that rays emitted from the ray source 10 can penetrate the luggage 70 to implement CT scanning on the luggage 70. The detection & collection device 30 may include detector and data collector formed in an integral module, such as planar detector, and may be configured to detect rays having penetrated the inspected liquid-state article, obtain analog signals, convert the analog signals into digital signals, and output projection data of the inspected luggage 70 with respect to the x rays. The controller 50 is configured to control respective components of the entire system to operate in synchronization. The computer data processor 60 is configured to process data collected by the data collector, reconstruct on the data and output results.

As shown in FIG. 1, the ray source 10 is placed on one side of the inspected luggage 70. The detection & collection device 30 placed on the other side of the luggage 70 includes detector and data collector configured to perspective data and/or multi-angle projection data of the luggage 70. The data collector includes data amplifying & shaping circuit operable in a (current) integration mode or a pulse (counting) mode. The detection & collection device 30 has a data output cable coupled with the controller 50 and the computer data processor 60 and configured to store the collected data in the computer data processor 60 in accordance with a trigger command.

Figure 2:
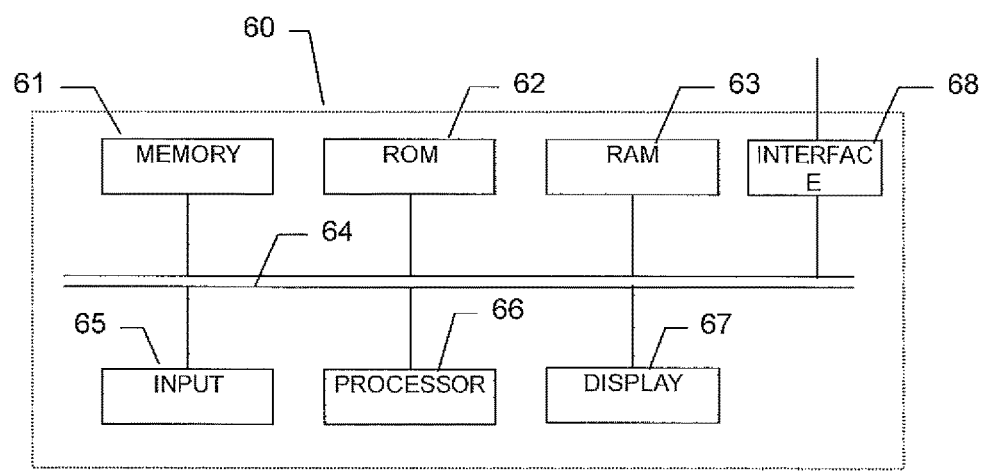
FIG. 2 shows a schematic block diagram of a computer data processor according to an embodiment of the present disclosure.

FIG. 2 shows a block diagram of the computer data processor 60 of FIG. 1. Data collected by the data collector are stored in a memory 61 through an interface unit 68 and a bus 64, as shown in FIG. 2. Read Only Memory (ROM) 62 stores configuration information and programs of the computer data processor. Random Access Memory (RAM) 63 is configured to temporarily store various data during operation of processor 66. Further, the memory 61 stores computer programs for data processing. The internal bus 64 connects the memory 61, ROM 62, RAM 63, input device 65, processor 66, display device 67 and interface unit 68 with each other.

When a user inputs an operation command via the input device 65, such as keyboard and mouse, instruction codes of computer programs instruct the processor 66 to execute predetermined data processing algorithms. The results of data processing are displayed on the display device 67, such as LCD display, or directly outputted in a hardcopy form, such as being printed out.

Figure 3:
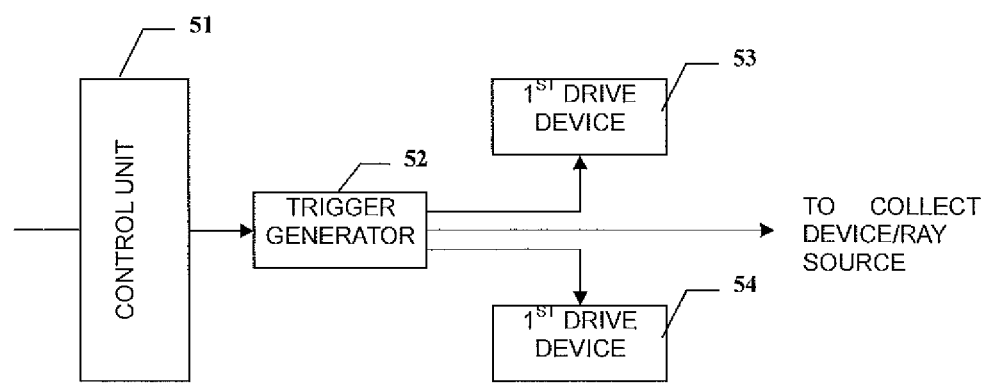
FIG. 3 shows a schematic block diagram of a controller according to an embodiment of the present disclosure.

FIG. 3 shows a block diagram of the controller according to an embodiment of the present disclosure. As shown in FIG. 3, the controller 50 includes a control unit 51 configured to control the ray source 10, the bearing mechanism 40, and the detection & collection device 30 in accordance with an instruction from the computer 60, a trigger signal generation unit 52 configured to generate, under control of the control unit, trigger commands for triggering actions of the ray source 10, the bearing mechanism 40, and the detection & collection device 30, a first driving device configured to drive the bearing mechanism 40 to convey the inspected luggage 70 in accordance with a trigger command generated by the trigger signal generation unit 52 under control of the control unit, and a second driving device 54 configured to drive the rack 20 to rotate in accordance with a trigger command generated by the trigger signal generation unit 52 under control of the control unit.

The projection data obtained by the detection & collection device 30 are stored in the computer 60 for reconstructing CT sections, and thus obtaining slice data (CT slice) of the luggage 70. Then, the computer 60 execute software, for example, to extract 3D shape parameter for at least one object contained in the luggage 70 from the slice data for security inspection. According to a further embodiment, the above CT system may be a dual-energy CT system, that is, the x-ray source 10 in the rack 10 emits two kinds of rays of high and low energy levels, and the detection & collection device 30 detects projection data of the different energy levels. Then, the computer data processor 60 performs dual-energy CT reconstruction to obtain equivalent atomic number and electron density data for respective sections of the luggage 70.

Figure 4:
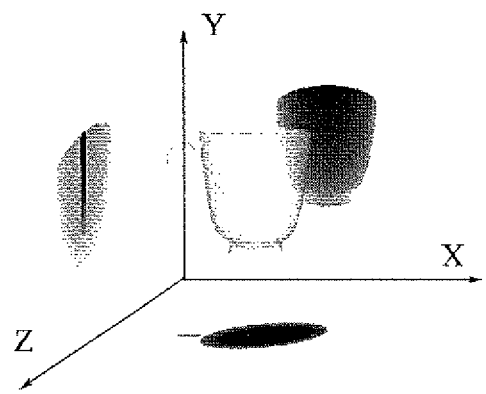
FIG. 4 is a schematic diagram depicting depth projection from three view angles View1, View2, and View3.
Figure 5:
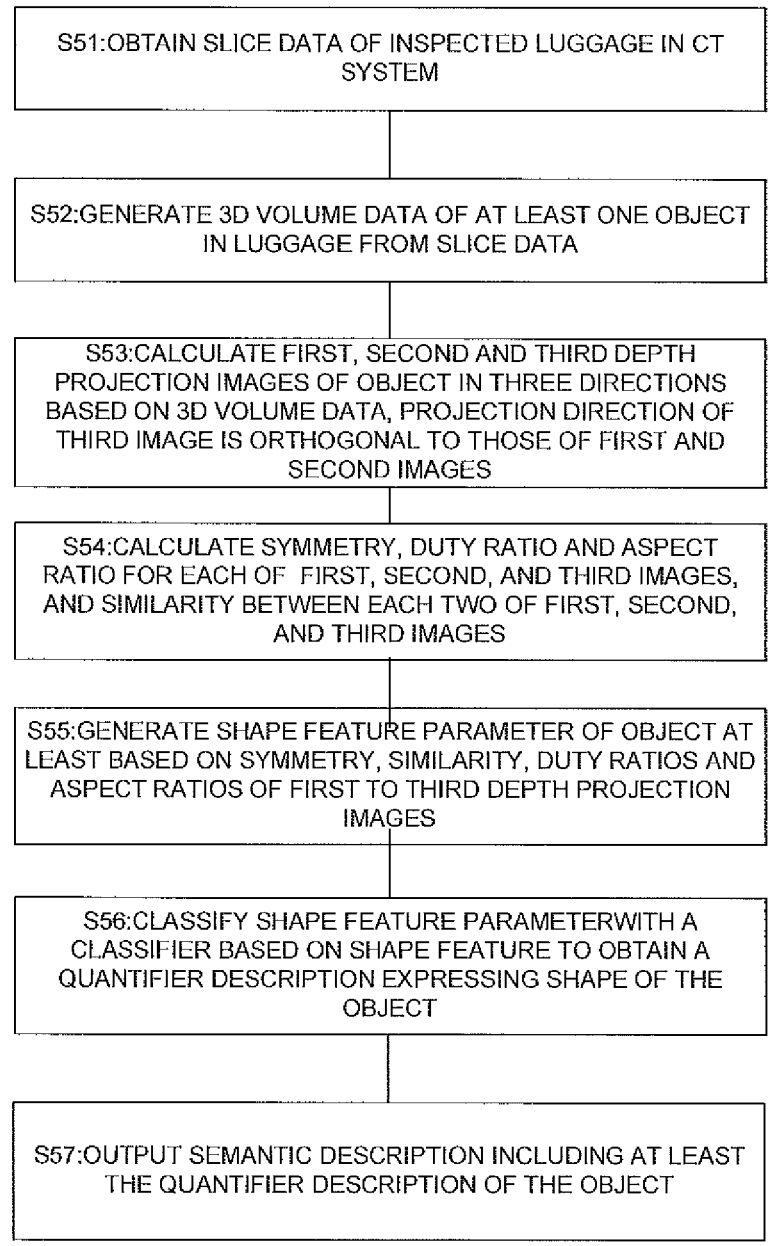
FIG. 5 is a flowchart showing a method for detecting an object in a CT system according to an embodiment of the present disclosure.

FIG. 4 is a schematic diagram showing definition of respective view angles in a method according to an embodiment of the present disclosure. FIG. 5 is a flowchart showing a method for luggage inspection in a CT system according to an embodiment of the present disclosure. Slice data of the inspected luggage are obtained in the CT system at step S51. For example, the above-described CT apparatus or another CT apparatus may be used to perform dual-energy CT inspection on the luggage to obtain slice data. Here, the slice data generally include slice density image data and slice atomic number image data. In other embodiments of mono-energy CT, for example, the slice data include linear attenuation coefficient image data.

At step S52, 3D volume data of at least one object in the luggage are generated from the slice data. In an embodiment, the 3D volume data may be generated by perform inter-slice interpolation of the slice data. In another embodiment, after obtaining DECT density image and atomic number image for a series of consecutive sections, each of the images undergoes 3D interpolation so that the resolution of the images are the same both inside each section and between sections. There are many know algorithms for 3D interpolation, such as commercially available software Intel IPP (Intel Integrated Performance Primitives) function library, or open source software Kitware VTK (Visualization Toolkit) function library. The 2D slice data are converted into 3D volume data through the interpolation.

At step S53, first, second and third depth projection images of the object in three directions are calculated based on the 3D volume data. The projection direction of the third depth projection image is orthogonal to those of the first and second depth projection images. According to another embodiment, the projection directions of the first and second depth projection images are made as orthogonal as possible (e.g., approximately orthogonal), and approximate directions of maximal and minimal projection areas of the image, respectively.

Depth Buffer is also called Z-buffering, and a basis technology for 3D surface display. This technology determines occlusion between objects, and displays non-occluded part(s) on a screen. Currently, Depth Buffer is a typical technology used in 3DOR (3D Object Retrieval), and is highly complex because it often involves tens of projections. In an embodiment, just three depth projection images are used as shown in FIG. 4. The first projection is defined as $I_1$ to obtain a "primary view." Here, it is approximated with a projection having the maximal area. The projection in the XOY plane of FIG. 2 is $I_1$. The second projection is defined as $I_2$ to obtain a "top view." Here, it is approximated with a projection having the minimal area. The projection in the XOZ plane of FIG. 2 is $I_2$. The directions of the two projections are orthogonal to each other in FIG. 2. In real applications, however, it is not necessary to meet the condition of orthogonality, and an angle between the two projection directions may also be used as one of the features. The third projection is defined as $I_3$ to obtain a "side view." $I_3$ may be obtained by projecting along a direction orthogonal to the projection directions of $I_1$ and $I_2$. The projection in the YOZ plane of FIG. 4 is $I_3$.

To be noted, 6 images may be obtained by projecting along X, Y, Z directions and opposite directions thereof in FIG. 4. The projections of each direction and an opposition direction thereof are similar, since details have been removed during the 3D surface segmentation. Here, just three projections are used to reduce computation complex.

A method of traversing through all rotation angles may be used to find the maximal-area or minimal-area projection, but is too complex. Here, with reference to the algorithm Rectilinearity, a genetic algorithm may be used to rapidly estimate the first two projection directions.

Symmetry of each of the images $I_1 \sim I_3$ reflects self-similarity of an object, and is an important shape feature. Here, to facilitate computation, each of $I_1 \sim I_3$ may be aligned through PCA (Principal Component Analysis) so that the 2D image has the maximal divergence along the x axis, that is, the symmetry of upper and lower halves of the image is the greatest. Hereafter, $I_1 \sim I_3$ refer to such aligned images.

At step S54, a metric of symmetry, and a duty ratio and aspect ratio is calculated for each of the first, second, and third depth projection images, and a metric of similarity is calculated for each two of the first, second, and third depth projection images.

In some embodiments, for $I_1 \sim I_3$, one or more of the symmetry metrics, the symmetry metrics between two images, the duty ratios and aspect ratios, or any combination thereof may be selected as shape feature parameter. Further, as described above, the angle between the projection directions of $I_1$ and $I_2$ reflects the shape of the object, and may be used as one of the feature parameters. The volume of the object reflects the size of the object, and may be used as one of the features.

Let the depth projection image has grey values in the range [0, 1], a grey value denotes indefinite point, and a non-zero grey value denotes a distance between a facet and the observation location. The grey value increase as the distance decreases. The above features may be obtained as follows.

i) Calculate symmetries $f_1^S \sim f_3^S$ of upper and lower halves for $I_1 \sim I_3$. Let $I_1' \sim I_3'$ denote images obtained by turning $I_1 \sim I_3$ upside down, and the symmetry $f_i^S$ may be defined as:

$$f_i^S = \Sigma |I_i - I_i'|/\Sigma(I_i > 0|I_i' > 0) \qquad (1)$$

That is, the symmetry is calculated based on an average grey difference between the upside-down image and the original image.

ii) Calculate a duty ratio $f_i^D$ and an aspect ratio $f_i^R$ for each of $I_1$, $I_2$ and $I_3$.

The size of a depth projection image is defined by view port, and does not reflect any property of an object. Depth projection aspect ratio and duty ratio calculated after alignment can well describe microscopic characteristics of an object. The aspect ratio $f_i^R$ may be easily calculated by obtaining a rectangular box enclosing $I_i$. Than, the number of non-zero pixels in the rectangular box may be calculated, and divided by the area of the box to obtain the duty ratio $f_i^D$.

iii) Calculate similarity $f_i^B$ between any two of $I_1$, $I_2$, and $I_3$.

The boxes enclosing $I_1$, $I_2$ have been obtained in above ii). The images in the boxes are cropped out to produce $I_1^R$, $I_2^R$. $I_2^R$ is scaled into $I_2^{R'}$ having the same size as $I_1^R$. $I_2^{R'}$ reversed to produce $I_2^{R''}$. Now $f_1^B$ may be defined as:

$$f_1^R = \max((\Sigma|I_1^R - I_2^{R'}|/\Sigma(I_1^R > 0|I_2^{R'} > 0)),(\Sigma|I_1^R - I_2^{R''}|/\Sigma(I_1^R > 0|I_2^{R''} > 0))) \qquad (2)$$

The similarity may be calculated in a similar manner to the symmetry of equation (1), and the difference is that the images are normalized in size. $f_1^B$ may take a larger one from the similarities for $(I_1^R, I_2^{R'})$ and $(I_1^R, I_2^{R''})$. The similarity $f_2^B$ between $I_2$, and $I_3$, and the similarity $f_3^D$ between $I_3$ and $I_1$ can be obtained in the same manner.

iv) Acquire an angle θ between the two directions of the projections $I_1$ and $I_2$ obtained in the depth projection process, as a feature. The model volume V reflects the size of the object, and may be used as a feature.

The shape feature parameters obtained in the above steps may be combined into a 14-dimensional shape feature vector F:

$$F = \{f_1^S, f_2^S, f_3^S, f_1^B, f_2^B, f_3^B, f_1^D, f_2^D, f_3^D, f_1^R, f_2^R, f_3^R, \theta, V\} \qquad (3)$$

At step S55, a shape feature parameter of the object is generated at least based on the metrics of symmetry, the metrics of similarity, the duty ratios and aspect ratios of the first to third depth projection images. In some embodiments, for example, the shape feature parameter may be generated based on one or more of the metrics of symmetry, the metrics of similarity, the duty ratios and aspect ratios, or the angle between the two directions of the projections $I_1$ and $I_2$ calculated in the above i) to iv).

At step S56, the shape feature parameter is classified with a classifier based on shape feature to obtain a quantifier description expressing the shape of the object.

After generation of the feature vector F, the process of creating the classifier corresponds to a general process in pattern recognition, and various types of classifier may be used, such as linear classifier, support vector machine, decision tree, neural network, and integrated classifier. These classifiers can be used to classify and recognize the shape of an unknown object after being trained. In an embodiment, the classifier is implemented with RF (Random Forest). Many known function libraries, such as Open source tool Opencv, include functions for implementing the RF algorithm, and thus description thereof is omitted here.

To be noted, in a training set, the objects acquired in the fifth step need to be manually labeled by the inspector as one of classes "Bag," "Piece," "Block," "Bottle," "Can," "Tube," "Bar," "Pack," "Box," and "Item." Now these predications are simply defined as follows.

"Bag" refers to a class of objects in a prolate package, such as a soft bag of milk, a prolate bag of homogeneous food, and a key feature thereof is aspect ratio.

"Piece" refers to a class of objects having a very small thickness, such as a thin book, materials for filling a case, and a knife, and a key feature thereof is aspect ratio.

"Block" refers to a class of objects having small similarity and duty ratio, such as a homogeneous object wrapped in a plastic bag which is not prolate.

"Bottle" refers to a class of objects like a bottle of mineral water, and key features thereof include similarity of each of projections in primary view and side view, duty ratio and aspect ratio.

"Can" refers to a class of objects like a pop can. It is similar to "bottle," but has larger duty ratio and aspect ratio;

"Bar" refers to a class of objects of a large length, such as sausage, timber, iron pipe, and a key feature thereof is aspect ratio.

"Tube" is refers to a class of objects having a length shorter than the object of "Bar," and good symmetry, such as cleansing facial milk, and glue.

"Box" refers to a class of rectangular objects having a thickness, and a duty ratio larger than the object of "Block," such as soap, various cosmetics, and foods, and key features thereof include duty ratio and aspect ratio.

"Pack" refers to a class of objects of a large volume, such as computer, and big, thick book, and a key feature thereof is volume. However, an object having a large volume does not belong to this class if it is determined as belonging to another class.

"Item" refers to other classes of objects in an extensive manner.

The above classification is different from people's common knowledge. A cup as shown in FIG. 4, for example, may be classified into the class of "Can." Such definition of class is associated with security inspection applications. For example, solid explosives usually appear in a form of "Bag,"

"Piece," or "Block." Liquid usually appears in a form of "Bottle," "Can," or "Tube," and controlled instrument mostly appears in a form of "Piece" or "Bar." The other classes like "Pack," "Box" and "Item" are supplement to the above common forms.

At step S57, the semantic description including at least the quantifier description of the object is outputted.

Interaction with the user may be conducted in various manners after obtaining the semantic description of each object in the inspected luggage. For example, the profile of the object may be directly displayed to draw the user's attention. Alternatively, the user may click on the screen to extract the object and display the description information, to facilitate the user to further learn and label the object. In specific occasions, constraints may be imposed with respect to object semantics, so that an object having the semantics specified by the constraints can be highlighted. In this way, it is possible to mitigate the inspector's fatigue, and improve work efficiency.

After learning the position, weight, and shape of the object, its description will be completed by further statistically obtaining the average atomic number and electron density (or linear attenuation coefficient in the case of mono-energy CT). The obtained information for predication may be sorted to generate the semantic description of the object, i.e., "shape+weight+density+atomic number+position."

Figure 6:
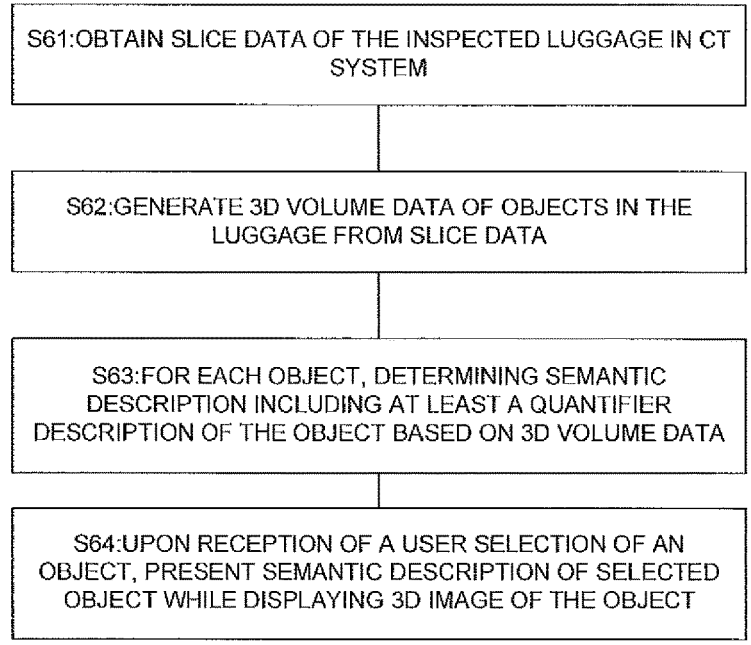
FIG. 6 is a flowchart showing a method for displaying an object in a CT system according to another embodiment of the present disclosure.

FIG. 6 is a flowchart showing a method for displaying an object in a CT system according to another embodiment of the present disclosure. In this embodiment, automatic auxiliary detection of objects in luggage can be achieved by automatic detection and description. The resultant descriptions of the objects are necessary supplement to manual detection, and also functions to enhance man-machine interaction. It is applicable and useful to mitigate the omission factor.

At step S61, slice data of the inspected luggage are obtained in the CT system.

At step S62, the 3D volume data of the respective objects in the luggage are generated from the slice data. Then, at step S63, for each object, a semantic description including at least a quantifier description of the object is determined based on the 3D volume data.

At step S64, upon reception of a user selection of an object, the semantic description of the selected object is presented while displaying the 3D image of the object.

In an example, the positions of all detected objects are marked in a display window. When the inspector selects a position in the area of one of the objects with a tool, such as mouse, the complete semantic description of the object is displayed. Further, the inspector may select one of the objects with a tool, such as mouse, and specifically label the selected object by adding further semantic description of the object. Constraint may be defined for semantic description, and only an object meeting the constraint may be displayed. For example, the constraint may be only notifying an object having a shape of "Bottle" and a weight above 200 grams. The position of a suspicious object may be represented in a 2D or 3D image to help the inspector check the object. The selected object may be highlighted. The selected object may also be displayed in a form of blocking the other objects. Alternatively, some constraints in the embodiments may be strengthen, for example, by further thresholding the volume data of the object or limiting the shape of the object, to achieve automatic detection of specific objects, such as explosives and contraband articles.

In other embodiments, the process of generating semantic description for each object in the inspected luggage may be implemented with reference to the above embodiment described with FIG. 5.

Figure 7:
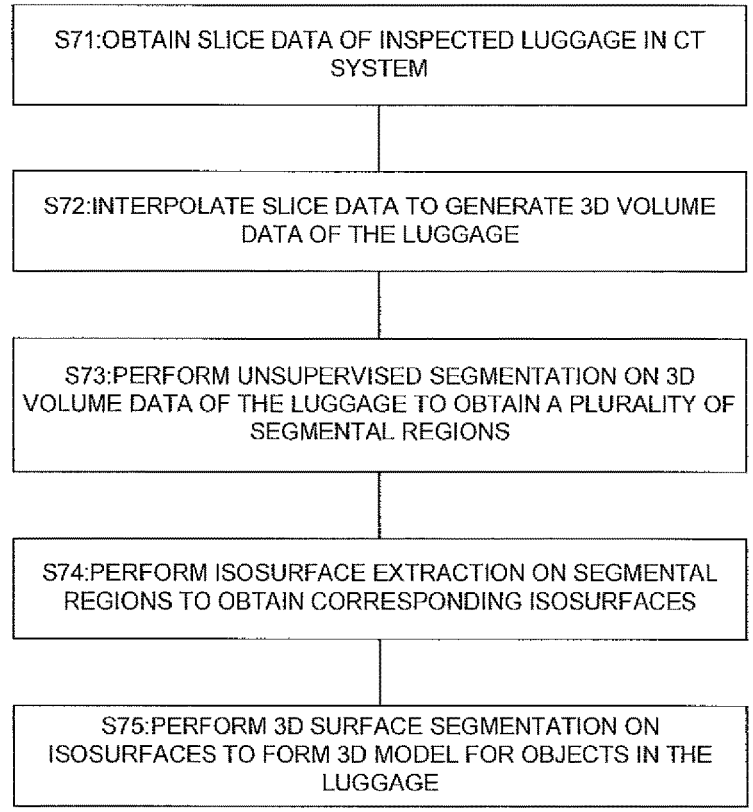
FIG. 7 is a flowchart showing a method for creating a 3D model for objects in luggage in a CT system according to another embodiment of the present disclosure.

According to an embodiment of the present disclosure, prior to depth projection, a 3D model may be created for each object in the inspected luggage for shape feature extraction and security inspection. FIG. 7 is a flowchart showing a method for creating a 3D model for objects in luggage in a CT system according to another embodiment of the present disclosure.

As shown in FIG. 7, at step S71, slice data of the inspected luggage are obtained in the CT system. At step S72, the 3D volume data of the luggage are generated by interpolating the slice data. The 3D volume data includes density volume data and atomic number volume data in the case of dual energy, while the 3D volume data includes linear attenuation coefficient in the case of mono energy.

After obtaining DECT density image and atomic number image for a series of consecutive sections, each of the images undergoes 3D interpolation so that the resolution of the images are the same both inside each section and between sections. There are many know algorithms for 3D interpolation, such as commercially available software Intel IPP (Intel Integrated Performance Primitives) function library, or open source software Kitware VTK (Visualization Toolkit) function library. The 2D slice data are converted into 3D volume data through the interpolation. Hereafter, the "volume data" include density volume data and atomic number volume data, except where it is specifically defined.

Then, the volume data is thresholded to remove disturbance of objects of no interest, such as clothes. This step may be omitted in practical applications. In this case, the amount of computation will increase, and more "objects" will be detected, leading to a degraded result.

Next, the volume data is filtered with a 3D bilateral filter. In an embodiment, a fast algorithm is used. This filtering may also be implemented using ITK (Insight Segmentation and Registration Toolkit) function library.

At step S73, unsupervised segmentation may be performed on the 3D volume data to obtain a plurality of segmental regions.

2D segmentation algorithms are usually based on information such as 4/8 neighbors, and gradient. Here, these processes need to be extended into 3D, for example, extending the 4 neighbors into 6 neighbors. Further, segmentation will be performed on both density volume data and atomic number volume data. The final segmentation result may be a weighted sum of the respective segmentation results of the two types of volume data. Alternatively, each voxel may be represented by a 2D vector including the two types of volume data, so that a unified segmentation result can be obtained. In addition, the segmentation needs to achieve an inadequate segmentation effect. Preferably, the Statistical Region Merging (SRM) algorithm may be used and extended into 3D processing. SRM is a bottom-to-up merging segmentation algorithm, which is extended in the embodiment as follows:

1) join the atomic number and density into a vector, i.e., each voxel being a 2D vector of the volume data; and replace a grey difference with a module of a difference vector between two vectors;
2) replace a 2D gradient with a 3D gradient; and replacing an area of a pixel in a 2D region with a volume of a voxel.

In doing so, unsupervised segmentation of DECT data can be implemented. The complexity of SRM segmentation result may be defined by a complexity parameter. The inadequate segmentation effect may be achieved by setting a low complexity parameter.

At step S74, the resultant segmental regions undergo isosurface extraction to obtain corresponding isosurfaces. Specifically, the isosurface extraction is performed on the segmental regions obtained in step S73 to obtain corresponding isosurfaces. In an embodiment, this may use Marching Cubes algorithm.

At step S75, 3D surface segmentation is performed on the isosurfaces to form a 3D model for the objects in the luggage.

Several objects having similar material features and closely adjacent positions may not be divided due to the inadequate segmentation in step S73. Therefore, surface segmentation is required for refining the 3D segmentation result. In an example, Mesh Segmentation algorithm may be used, which divides a curved surface into a plurality of convex surfaces. The algorithm is a supervised algorithm, and requires a specified number of segmentation results. In practical applications, the number of segmentation results may be first calculated or obtained iteratively in a manner similar to that of modifying K-Means clustering algorithm into an unsupervised one. However, such method can hardly give good result according to the experiments. Therefore, let's set the number of segmentation results as 10. The 10 segmentation results are subjected to Mesh Merge with reference to so-called Star-Convex hypothesis. Assume that among the segmentation results, a curved surface A has a center a, and a curved surface B has a center b, A and B will be jointed together if a line connecting a and b is inside the entire surface obtained at the third step (or the percentage of voxels outside the entire surface is less than certain threshold). The joining process is performed on each two of the 10 segmentation results to obtain the final segmentation result.

According to an embodiment of the present disclosure, the segmentation results may be subjected to further processing including three steps of hole-filling, smoothing, and model limiting, for example. The first two steps are basic operations in graphics, and may be implemented using open source software Kitware VTK (Visualization Toolkit) function library. Thus, details thereof will be omitted here. Then, the model is voxelized into voxels filled with density volume data, and the surface area, volume, and weight of the model is calculated. The model limiting step refers to removing small objects including objects that have small values in area, volume, and weight. There are two reasons for performing the limiting step. First, it can remove noisy objects, and make the result more useful in real applications. Second, the local details of many objects can be omitted so that subsequent shape recognition can be more accurate. Thresholds used in the limiting step depend on DECT resolution, and may be set with respect to real applications. For example, the threshold for weight may be set as 50 grams.

Various embodiments of apparatuses and methods for detecting objects, displaying, and creating 3D model have been described in detail with reference to block diagrams, flowcharts, and/or examples. In the case that such block diagrams, flowcharts, and/or examples include one or more functions and/or operations, those skilled in the art will appreciate that each function and/or operation in the block diagrams, flowcharts, and/or examples can be implemented, individually and/or collectively, as various hardware, software, firmware or substantially any combination thereof. In an embodiment, several parts of the subject matters illustrated in the embodiments, such as control process, may be implemented with application specific integrated circuit (ASIC), field programmable gate array (FPGA), digital signal processor (DSP) or any other integrated format. Those skilled in the art will appreciate that some aspects of the embodiments disclosed here, in part or as a whole, may be equivalently implemented in integrated circuit, as one or more computer programs running on one or more computers (e.g., one or more programs running on one or more computer systems), as one or more programs running on one or more processors (e.g., one or more programs running on one or more microprocessors), in firmware, or in substantially any combination thereof. Those skilled in the art are able to design circuits and/or write software and/or firm codes according to the present disclosure. Further, those skilled in the art will appreciate that the control process in the present disclosure can be distributed as various forms of program products. Whatever specific type of signal bearing medium is used to fulfill the distribution, the example embodiments of the subject matters of the present disclosure are applicable. Examples of the signal bearing medium include but not limited to recordable medium, such as floppy disk, hard disk drive, compact disk (CD), digital versatile disk (DVD), digital tape, computer memory, and transmission-type medium, such as digital and/or analog communication medium (e.g., optical fiber cable, waveguide, wired and wireless communication link).

The present disclosure has been described with reference to several exemplary embodiments. It will be appreciated that the terms used here are for illustration, are exemplary other than limiting. The present disclosure can be practiced in various forms within the spirit or subject matter of the present disclosure. It will be appreciated that the foregoing embodiments are not limited to any of the above detailed description, and should be construed in a broad sense within the spirit and scope defined by the appended claims. All changes and variations falling into the scope of the claims or their equivalents should be encompassed by the appended claims.

What is claimed is:

1. A method for inspecting luggage in a CT system, comprising:

obtaining slice data of the inspected luggage in the CT system;

generating 3D volume data of at least one object in the luggage from the slice data;

calculating first, second and third depth projection images of the object in three directions based on the 3D volume data, wherein projection direction of the third depth projection image is orthogonal to those of the first and second depth projection images;

calculating a metric of symmetry, and a duty ratio and aspect ratio for each of the first, second, and third depth projection images, and a metric of similarity between each two of the first, second, and third depth projection images;

generating a shape feature parameter of the object at least comprising on the metrics of symmetry, the metrics of similarity, the duty ratios and aspect ratios of the first to third depth projection images;

classifying the shape feature parameter with a classifier based on shape feature to obtain a quantifier description expressing the shape of the object; and outputting a semantic description including at least the quantifier description of the object;

wherein said generating 3D volume data of at least one object in the luggage from the slice data comprises:

interpolating the slice data to generate 3D volume data of the luggage; performing unsupervised segmentation on the 3D volume data of the luggage to obtain a plurality of segmental regions; performing isosurface extraction on the plurality of segmental regions to obtain corresponding isosurfaces; and performing 3D surface segmentation on the isosurfaces to form a 3D model for the objects in the luggage; and wherein the unsupervised segmentation is performed by using a Statistical Region Merging SRM which is extended into 3D processing by joining an atomic number and density of the 3D volume data into a vector so as to represent a 3D voxel as two vectors and replacing a grey difference in a conventional SRM with a module of a difference vector between the two vectors, replacing a 2D gradient in the conventional SRM with a 3D gradient, and replacing an area of a pixel in a 2D region in the conventional SRM with a volume of a voxel.

2. The method of claim 1, further comprising: calculating an angle between the projection directions of the first and second depth projection images, wherein the shape feature parameter further includes the angle.

3. The method of claim 1, further comprising: calculating a volume value of the object based on the 3D volume data, wherein the shape feature parameter further includes the volume value.

4. The method of claim 1, wherein the projection directions of the first and second depth projection images are substantially orthogonal to each other, and approximate directions of maximal and minimal projection areas of the object, respectively.

5. The method of claim 1, wherein the semantic description further comprises at least one of weight, density, atomic number and position of the object.

6. The method of claim 1, wherein the quantifier description comprises at least one of bag, piece, block, bottle, can, bar, box, pack, and item.

7. An apparatus for inspecting luggage in a CT system, comprising a processor and a storage device on which instructions are stored, the processor being configured to perform the instructions to:
obtain slice data of the inspected luggage in the CT system:
obtain slice data of the inspected luggage in the CT system;
generate 3D volume data of at least one object in the luggage from the slice data;
calculate first, second and third depth projection images of the object in three directions based on the 3D volume data, wherein projection direction of the third depth projection image is orthogonal to those of the first and second depth projection images;
calculate a metric of symmetry, and a duty ratio and aspect ratio for each of the first, second, and third depth projection images, and a metric of similarity between each two of the first, second, and third depth projection images;
generate a shape feature parameter of the object at least comprising on the metrics of symmetry, the metrics of similarity, the duty ratios and aspect ratios of the first to third depth projection images;
classify the shape feature parameter with a classifier based on shape feature to obtain a quantifier description expressing the shape of the object; and
output a semantic description including at least the quantifier description of the object;
wherein the apparatus is further configured to:

interpolate the slice data to generate 3D volume data of the luggage; perform unsupervised segmentation on the 3D volume data of the luggage to obtain a plurality of segmental regions; perform isosurface extraction on the plurality of segmental regions to obtain corresponding isosurfaces; and perform 3D surface segmentation on the isosurfaces to form a 3D model for the objects in the luggage; and wherein the unsupervised segmentation is performed by using a Statistical Region Merging SRM which is extended into 3D processing by joining an atomic number and density of the 3D volume data into a vector so as to represent a 3D voxel as two vectors and replacing a grey difference in a conventional SRM with a module of a difference vector between the two vectors, replacing a 2D gradient in the conventional SRM with a 3D gradient, and replacing an area of a pixel in a 2D region in the conventional SRM with a volume of a voxel.

8. A method for displaying objects in a CT system, comprising:
obtaining slice data of inspected luggage in the CT system;
generating 3D volume data of objects in the luggage from the slice data;
calculating a metric of symmetry, and a duty ratio and aspect ratio for each of the first, second, and third depth projection images, and a metric of similarity between each two of the first, second, and third depth projection images;
generating a shape feature parameter of the object at least comprising the metrics of symmetry, the metrics of similarity, the duty ratios and aspect ratios of the first to third depth projection images;
classify the shape feature parameter with a classifier based on shape feature to obtain a quantifier description expressing the shape of the object; and
outputting a semantic description including at least the quantifier description of the object; and upon reception of a user selection of an object, presenting the semantic description of the selected object while displaying a 3D image of the object;
wherein said generating 3D volume data of at least one object in the luggage from the slice data comprises:
interpolating the slice data to generate 3D volume data of the luggage; performing unsupervised segmentation on the 3D volume data of the luggage to obtain a plurality of segmental regions; performing isosurface extraction on the plurality of segmental regions to obtain corresponding isosurfaces; and performing 3D surface segmentation on the isosurfaces to form a 3D model for the objects in the luggage; and
wherein the unsupervised segmentation is performed by using a Statistical Region Merging SRM which is extended into 3D processing by joining an atomic number and density of the 3D volume data into a vector so as to represent a 3D voxel as two vectors and replacing a grey difference in a conventional SRM with a module of a difference vector between the two vectors, replacing a 2D gradient in the conventional SRM with a 3D gradient, and replacing an area of a pixel in a 2D region in the conventional SRM with a volume of a voxel.

9. The method of claim 8, wherein the semantic description further comprises at least one of weight, density, atomic number and position of the object.

10. The method of claim 8, further comprising: calculating an angle between the projection directions of the first and second depth projection images, wherein the shape feature parameter further includes the angle.

11. The method of claim 8, further comprising: calculating a volume value of the object based on the 3D volume data, wherein the shape feature parameter further includes the volume value.

12. The method of claim 8, wherein the projection directions of the first and second depth projection images are substantially orthogonal to each other, and approximate directions of maximal and minimal projection areas of the object, respectively.

13. The method of claim 8, wherein the selected object is highlighted while the other objects are blocked.

14. An apparatus for displaying objects in a CT system, comprising a processor and a storage device on which instructions are stored, the processor being configured to perform the instructions to:

obtain slice data of inspected luggage in the CT system;

generate 3D volume data of objects in the luggage from the slice data;

calculate a metric of symmetry, and a duty ratio and aspect ratio for each of the first, second, and third depth projection images, and a metric of similarity between each two of the first, second, and third depth projection images;

generate a shape feature parameter of the object at least comprising the metrics of symmetry, the metrics of similarity, the duty ratios and aspect ratios of the first to third depth projection images;

classify the shape feature parameter with a classifier based on shape feature to obtain a quantifier description expressing the shape of the object; and output a semantic description including at least the quantifier description of the object; and upon reception of a user selection of an object, present the semantic description of the selected object while displaying a 3D image of the object;

wherein the apparatus is further configured to:

interpolate the slice data to generate 3D volume data of the luggage; perform unsupervised segmentation on the 3D volume data of the luggage to obtain a plurality of segmental regions; perform isosurface extraction on the plurality of segmental regions to obtain corresponding isosurfaces; and perform 3D surface segmentation on the isosurfaces to form a 3D model for the objects in the luggage; and wherein the unsupervised segmentation is performed by using a Statistical Region Merging SRM which is extended into 3D processing by joining an atomic number and density of the 3D volume data into a vector so as to represent a 3D voxel as two vectors and replacing a grey difference in a conventional SRM with a module of a difference vector between the two vectors, replacing a 2D gradient in the conventional SRM with a 3D gradient, and replacing an area of a pixel in a 2D region in the conventional SRM with a volume of a voxel.

* * * * *